(12) United States Patent
Islam et al.

(10) Patent No.: US 10,484,151 B2
(45) Date of Patent: Nov. 19, 2019

(54) CONTROLLING RANDOM-ACCESS CHANNEL (RACH) RETRANSMISSIONS FOR WIRELESS COMMUNICATION

(71) Applicant: QUALCOMM Incorporated, San Diego, CA (US)

(72) Inventors: Muhammad Nazmul Islam, Edison, NJ (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/892,690

(22) Filed: Feb. 9, 2018

(65) Prior Publication Data

US 2018/0254859 A1    Sep. 6, 2018

Related U.S. Application Data

(60) Provisional application No. 62/466,318, filed on Mar. 2, 2017.

(51) Int. Cl.
| | |
|---|---|
| *H04L 1/18* | (2006.01) |
| *H04W 74/08* | (2009.01) |
| *H04W 72/08* | (2009.01) |
| *H04W 72/04* | (2009.01) |

(52) U.S. Cl.
CPC ......... *H04L 1/189* (2013.01); *H04W 72/0446* (2013.01); *H04W 72/085* (2013.01); *H04W 74/0833* (2013.01); *H04W 72/046* (2013.01)

(58) Field of Classification Search
CPC .............. H04L 1/189; H04W 74/0833; H04W 72/085; H04W 72/0446; H04W 72/046
See application file for complete search history.

(56) References Cited

U.S. PATENT DOCUMENTS

| | | | |
|---|---|---|---|
| 8,081,974 B2 | 12/2011 | Fischer et al. | |
| 9,078,257 B2 | 7/2015 | Fong et al. | |
| 9,699,823 B2 | 7/2017 | Park et al. | |
| 2009/0257421 A1 | 10/2009 | Nakashima et al. | |

(Continued)

OTHER PUBLICATIONS

Catt: "Further Details on NR 4-Step RA Procedure", 3GPP Draft; R1-1702066, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13, 2017-Feb. 17, 2017, Feb. 12, 2017 (Feb. 12, 2017), XP051209227, 6 pages, Retrieved from the Internet: URL: http://www.3gpp.org/ftp/Meetings_3GPP_SYNC/RAN1/Docs/ [retrieved on Feb. 12, 2017].

(Continued)

*Primary Examiner* — Ajay Cattungal

(74) *Attorney, Agent, or Firm* — Loza & Loza LLP

(57) ABSTRACT

Various aspects of the disclosure provide for methods of communication. One method, at a base station, involves determining a maximum number of consecutive MSG1 retransmissions that a user equipment (UE) is permitted to perform, and transmitting the maximum number of consecutive MSG1 retransmissions to the UE. Another method involves receiving a maximum number of consecutive MSG1 retransmissions to be performed, and transmitting consecutive MSG1 retransmission signals for the maximum number of times.

22 Claims, 14 Drawing Sheets

(56) References Cited

U.S. PATENT DOCUMENTS

| | | | | |
|---|---|---|---|---|
| 2010/0275086 | A1* | 10/2010 | Bergquist | H04L 1/1812 714/748 |
| 2011/0158144 | A1* | 6/2011 | Sung | H04W 52/0216 370/311 |
| 2012/0147830 | A1* | 6/2012 | Lohr | H04W 72/042 370/329 |
| 2013/0044595 | A1* | 2/2013 | Han | H04W 28/0242 370/230 |
| 2013/0258919 | A1* | 10/2013 | Damnjanovic | H04W 52/0209 370/311 |
| 2014/0126581 | A1* | 5/2014 | Wang | H04W 4/70 370/431 |
| 2014/0185467 | A1* | 7/2014 | Heo | H04W 52/54 370/252 |
| 2015/0117374 | A1* | 4/2015 | Wu | H04W 74/0833 370/329 |
| 2015/0117410 | A1* | 4/2015 | Wu | H04L 1/08 370/331 |
| 2015/0124746 | A1* | 5/2015 | Wu | H04W 74/0833 370/329 |
| 2016/0173226 | A1* | 6/2016 | Choi | H04L 5/001 455/1 |
| 2016/0219624 | A1 | 7/2016 | Lin et al. | |
| 2017/0078963 | A1* | 3/2017 | Qi | H04W 52/0216 |
| 2017/0347376 | A1* | 11/2017 | Sakai | H04W 72/08 |
| 2018/0103419 | A1* | 4/2018 | Lee | H04W 48/12 |
| 2018/0110084 | A1* | 4/2018 | Dinan | H04W 52/0225 |
| 2018/0110085 | A1* | 4/2018 | Tseng | H04W 76/28 |
| 2018/0145798 | A1* | 5/2018 | Suzuki | H04J 11/00 |
| 2018/0279373 | A1* | 9/2018 | Lee | H04W 48/14 |

OTHER PUBLICATIONS

International Search Report and Written Opinion—PCT/US2018/017840—ISA/EPO—dated Apr. 24, 2018.

LG Electronics: "Discussion on RACH Procedure", 3GPP Draft; R1-1700463; Discussion on RACH Procedure,3rd Generation Partnership Project (3GPP), Mobile Competence Centre; 650, Route Des Lucioles; F-06921 Sophia-Antipolis Cedex; France, vol. RAN WG1, No. Spokane, USA; Jan. 16, 2017-Jan. 20, 2017, Jan. 10, 2017 (Jan. 10, 2017), XP051202887, 5 pages, Retrieved from the Internet: URL:http://www.3gpp.org/ftp/tsg_ran/WG1_RL1/TSGR1_AH/NR_AH_1701/Docs/ [retrieved on Jan. 10, 2017].

Samsung: "NR 4-Step Random Access Procedure", 3GPP Draft; R1-1700891, 3rd Generation Partnership Project (3GPP), Mobile Competence Centre; 650, Route Des Lucioles; F-06921 Sophia-Antipolis Cedex; France, vol. RAN WG1, No. Spokane, WA; Jan. 16, 2017-Jan. 20 2017, Jan. 16, 2017 (Jan. 16, 2017), XP051208407, 14 pages, Retrieved from the Internet: URL:http://www.3gpp.org/ftp/Meetings_3GPP_SYNC/RAN1/Docs/ [retrieved on Jan. 16, 2017].

ZTE et al: "On Multiple Msg.1 Transmissions", 3GPP Draft; R1-1703399, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13, 2017-Feb. 17, 2017, Feb. 12, 2017 (Feb. 12, 2017), XP051210527, 4 pages, Retrieved from the Internet: URL:http://www.3gpp.org/ftp/Meetings_3GPP_SYNC/RAN1/Docs/ [retrieved on Feb. 12, 2017].

* cited by examiner

| Backoff Indicator Index | (random) Backoff Parameter Value (ms) |
|---|---|
| 0 | 0 |
| 1 | 10 |
| 2 | 20 |
| 3 | 30 |
| 4 | 40 |
| 5 | 60 |
| 6 | 80 |
| 7 | 120 |
| ... | ... |

| Consecutive Retransmission Index | (max) Number of Consecutive Retransmissions |
|---|---|
| 0 | 1 |
| 1 | 2 |
| 2 | 4 |
| 3 | 6 |

FIG. 6

CONTROLLING RANDOM-ACCESS CHANNEL (RACH) RETRANSMISSIONS FOR WIRELESS COMMUNICATION

CROSS-REFERENCE TO RELATED APPLICATION(S)

This application claims priority to and the benefit of provisional patent application No. 62/466,318 filed in the U.S. Patent and Trademark Office on Mar. 2, 2017, the entire content of which is incorporated herein by reference.

INTRODUCTION

Various aspects described herein relate to wireless communication and, more particularly but not exclusively, to controlling random-access channel (RACH) retransmissions for wireless communications.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies. For example, in LTE, a user equipment (UE) generally transmits a MSG1 (e.g., RACH request) to access an LTE network and then backs off for a certain duration before retransmitting the MSG1. However, this procedure is often inefficient, particularly in the case where the transmit power of the UE is relatively weak.

In some multiple access wireless communication systems, several devices communicate with a base station. In some scenarios, the base station is equipped with multiple transmit antennas and multiple receive antennas. One example is a millimeter wave (mmW) system where multiple antennas are used for beamforming (e.g., in the range of 30 GHz, 60 GHz, etc.). Such a base station may communicate with the devices in a time-division-multiplexing (TDM) or time-division-duplexing (TDD) manner That is, the base station transmits to a first device in a first time interval and then to a second device subsequently in a second time interval. Often, the beamforming directions to these two devices are distinct. As a result, the base station may change its beamforming setting from the first time interval to the second time interval.

FIG. 1 illustrates a communication system 100 where a mmW base station (BS) 102 communicates with a first mmW user equipment (UE) 104 and a second mmW UE 106 via different beamforming directions. As indicated by a set of beams 108, the mmW base station 102 may communicate via any one of a plural of directional beams. As indicated by a set of beams 110, the first mmW UE 104 may communicate via any one of a plural of directional beams. As indicated by a set of beams 112, the second mmW UE 106 may communicate via any one of a plural of directional beams. For example, the base station 102 may communicate with the first mmW UE 104 via a first beamforming direction 114 and communicate with the second mmW UE 106 via a second beamforming direction 116.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect, the disclosure provides for a method of communication at a base station, including determining a maximum number of consecutive MSG1 retransmissions that a user equipment (UE) is permitted to perform, and transmitting the maximum number of consecutive MSG1 retransmissions to the UE.

Another aspect of the disclosure provides for a method of communication at a user equipment (UE), including receiving a maximum number of consecutive MSG1 retransmissions to be performed, and transmitting consecutive MSG1 retransmission signals for the maximum number of times.

Another aspect of the disclosure provides for an apparatus for communication, including a memory device, and a processing circuit coupled to the memory device and configured to determine a maximum number of consecutive MSG1 retransmissions that a user equipment (UE) is permitted to perform, and transmit the maximum number of consecutive MSG1 retransmissions to the UE.

Another aspect of the disclosure provides for an apparatus for communication, including a memory device, and a processing circuit coupled to the memory device and configured to receive a maximum number of consecutive MSG1 retransmissions to be performed, and transmit consecutive MSG1 retransmission signals for the maximum number of times.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

The accompanying drawings are presented to aid in the description of aspects of the disclosure and are provided solely for illustration of the aspects and not limitations thereof.

FIG. 5 illustrates a backoff parameter table in accordance with some aspects of the disclosure.

FIG. 6 illustrates a consecutive MSG1 retransmissions parameter table in accordance with some aspects of the disclosure.

DETAILED DESCRIPTION

Various aspects of the disclosure relate to controlling random-access channel (RACH) retransmissions. In some aspects, the controlling the RACH retransmissions (or MSG1 retransmissions) improves efficiency in RACH procedures that enable a user equipment (UE) to access a wireless network. For example, controlling the RACH retransmissions may allow a base station to non-coherently combine separate signals across multiple consecutive RACH/MSG1 retransmissions. This may improve detection of MSG1 by reducing the randomness of retransmission time. Such randomness may not allow for non-coherent combining. As another benefit, controlling the RACH retransmissions may also allow a UE to retransmit MSG1 with different transmit beams. As a result, a UE without beam correspondence may transmit RACH quickly and successfully.

In one aspect, the disclosure involves a method of communication at a base station, where the base station determines a maximum number of consecutive MSG1 retransmissions that a UE is permitted to perform, and transmits the maximum number of consecutive MSG1 retransmissions to the UE.

In another aspect, the disclosure involves a method of communication at a UE, where the UE receives a maximum number of consecutive MSG1 retransmissions to be performed, and transmits consecutive MSG1 retransmission signals for the maximum number of times.

Examples for Controlling RACH/MSG1 Retransmissions

Figure 1:
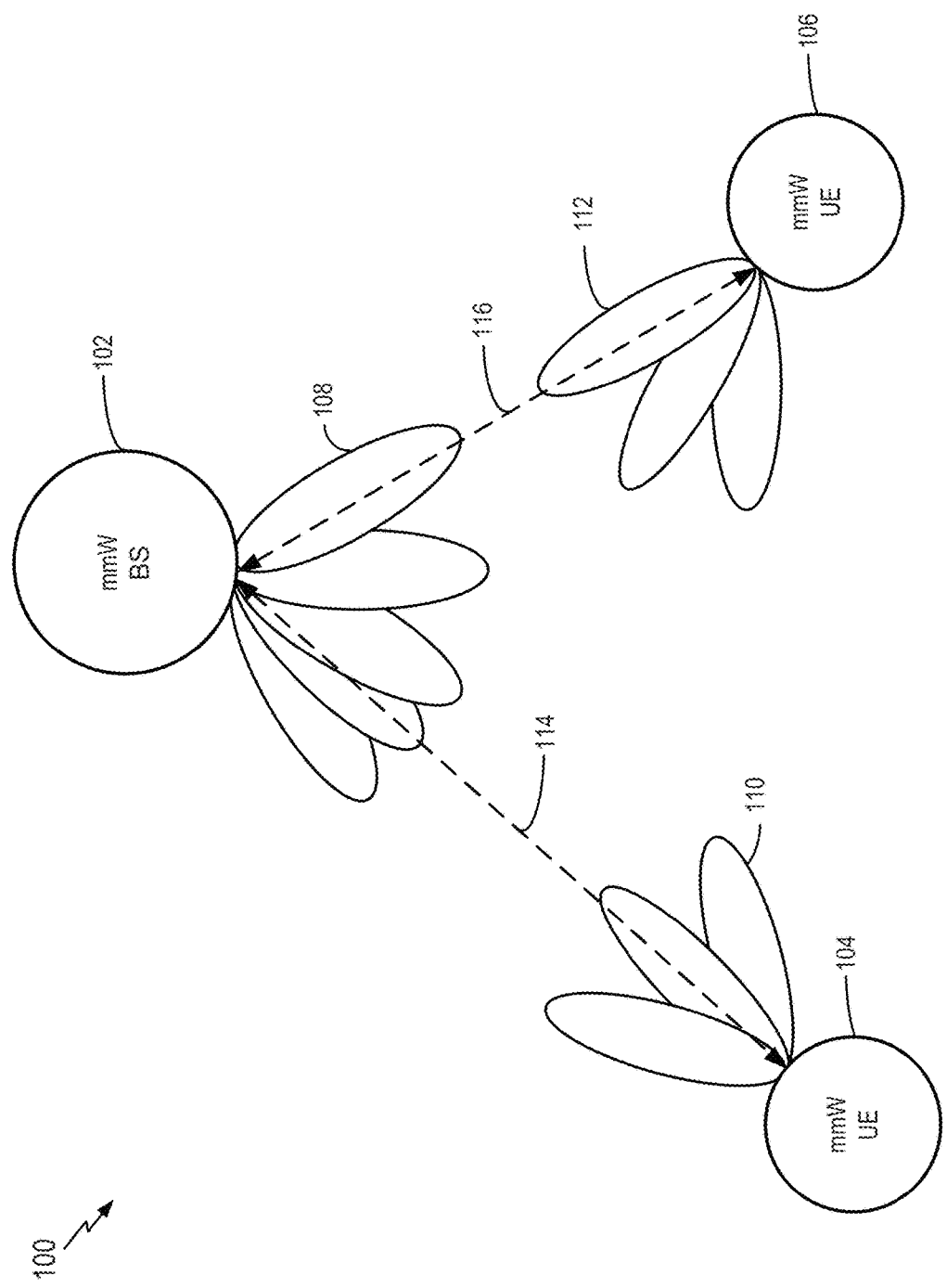
FIG. 1 illustrates an example communication system employing beamforming within which aspects of the disclosure may be implemented.
Figure 2:
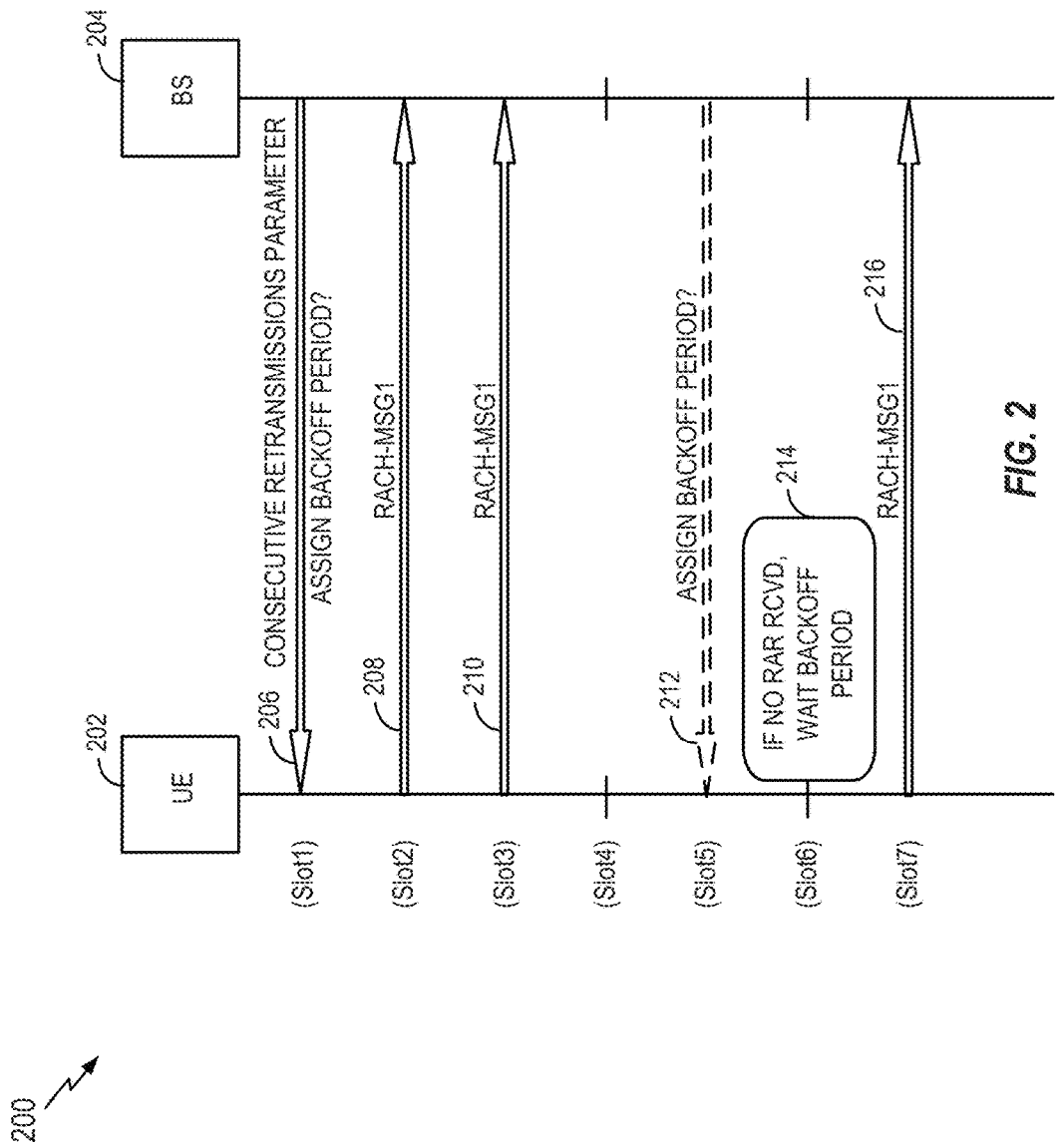
FIG. 2 illustrates an example communication system for controlling RACH/MSG1 retransmissions in accordance with some aspects of the disclosure.

FIG. 2 illustrates an example communication system 200 for controlling RACH/MSG1 retransmissions in accordance with some aspects of the disclosure. The system 200 includes a UE 202 (e.g., mmW UE such as 104/106 of FIG. 1) in communication with a base station (BS) 204 (e.g., eNode B or mmW base station such as 102 of FIG. 1). In some aspects, the actions of the system 200 may be performed by any of the mmW base station 102 and/or UEs 104/106 of FIG. 1.

In a first slot (e.g., Slot1 or a subset of Slot1), the base station 204 transmits at 206 a consecutive retransmissions parameter (e.g., index or actual value) indicative of a maximum number of consecutive MSG1 retransmissions that the UE 202 is permitted to perform. As will be discussed in further detail below, an index may be used to look up an actual value of a parameter in a table, where the index uses less bits than an actual value would use. In one aspect, the base station 204 may also transmit a backoff period parameter (e.g., index or actual value) in at 206 for Slot1. For the example presented in FIG. 2, the consecutive retransmissions parameter can be 2 and the backoff period can be 40 milliseconds (ms).

In a second slot (e.g., Slot2 or subset of Slot2), the UE 202 transmits a first RACH request (e.g., MSG1) at 208. Note that, in one aspect, the UE 202 does not receive a Random Access Response (RAR) message (e.g., MSG2) from the base station 204 between Slot1 and Slot2.

In a third slot (e.g., Slot3 or subset of Slot3), the UE 202 transmits a second RACH request (e.g., MSG1) at 210. Since Slot3 is right after Slot2, the UE 202 has effectively transmitted consecutive MSG1 retransmission signals for the maximum number of times (i.e., 2 for this example). In one aspect, any of the first, second or third slots may contain one or more RACH occasions, during which the UE 202 may transmit a RACH request. As such, in one aspect, both the first and second RACH requests may be sent during the second slot, or the third slot. As contrasted with prior approaches such as those used in LTE, this consecutive MSG1 transmissions approach avoids the randomness of the retransmission attempt, which allows for some of the advantages described herein.

In one aspect, the BS 204 can receive both the first RACH request (e.g., MSG1) at 208 and the second RACH request (e.g., MSG1) at 210 before expiration of a random access response (RAR) window, such that the number of MSG1 retransmissions corresponding to the consecutive retransmissions parameter have been sent before expiration of the RAR window. In this example, the consecutive MSG1 retransmissions occur after one another.

In another aspect, the BS 204 can initially receive the first RACH request (e.g., MSG1) at 208, and then the second RACH request (e.g., MSG1) at 210 after expiration of a first RAR window, such that the MSG1 retransmissions (after the first MSG1 transmission) are each sent after expiration of a RAR window, until the number of MSG1 retransmissions performed reaches the consecutive retransmissions parameter. In this example, each consecutive MSG1 retransmission occurs after an intervening RAR window, and the next consecutive MSG1 retransmission occurs after a next RAR window. In such case, the MSG1 retransmissions are consecutive but spaced apart by intervening RAR windows. In one aspect, the BS 204 can determine whether the UE 202 is to send consecutive MSG1 retransmissions before a RAR window or after RAR windows, and communicate that information to the UE 202 (e.g., at 206 for example).

In a fourth slot (e.g., Slot4), no communication occurs and thus UE 202 still does not receive a Random Access Response (RAR) message (e.g., MSG2) from the base station 204.

In a fifth slot (e.g., RACH Slot5), the base station 204 may transmit at 212 a backoff period parameter (e.g., index or actual value) to the UE 202.

In a sixth slot (e.g., RACH Slot6), the UE 202 may wait at 214 for the assigned backoff period until retransmitting a MSG1 at 216 since no RAR was received. The backoff period may begin after the last consecutive MSG1 retransmission (e.g., at 210) or it may begin when assigned at 212. The backoff period may be 40 ms or it may be a random value uniformly distributed between 0 and 40 ms. In the latter case (and when the backoff was initially assigned rather than at 212), the UE 202 next retransmission after 210, may occur any time up to 40 ms. Assuming the first slot to be at time 0 and slots to be 5 ms apart, that retransmission may occur at any slot ranging from slot 3 to slot 10 (see slot timing diagram 300 in FIG. 3).

In one aspect, the UE 202 receives the assigned backup period at 212 but transmits multiple consecutive RACH requests (e.g., MSG1) until the consecutive retransmissions parameter is reached before waiting the assigned backup period. After the assigned backup period, and if no RACH was established, the UE 202 may continue sending multiple consecutive RACH requests.

In one aspect, the base station 204 may also transmit an indication as to whether the UE 202 is permitted to transmit with different transmit beams during consecutive MSG1 retransmissions. The different transmit beams may include beams in different directions and/or beams of different signal strength. The benefits of this capability will be described below.

In one aspect, the base station 204 may also transmit an indication to the UE 202 to transmit with a same preamble and a same resource during consecutive MSG1 retransmissions. The benefits of this capability will be described below.

In one aspect, the base station may transmit the maximum number of consecutive MSG1 retransmissions to the UE and/or the back period parameter on one or more of a master information block (MIB), a minimum system information block (SIB), a SIB, a physical downlink control channel (PDCCH), physical downlink shared channel (PDSCH) and a radio resource control (RRC) configuration channel. In one aspect, this information is transmitted using only the minimum SIB.

As to the SIB, minimum SIB, and MIB, in some multiple access wireless communication networks, several devices communicate with a base station. For example, an eNode B may serve several user equipment (UEs). In such a network, system information (SI) may is delivered through broadcast signaling. The system information may be delivered in blocks referred to a system information blocks (SIBs).

In some aspects, the delivery of system information may involve: 1) broadcasting a limited amount of the system information; and 2) using unicast signaling for delivery of the remaining system information. For convenience, the limited amount of the system information may be referred to as "minimum SI". In some aspects, minimum SI may be broadcast in two blocks: a Physical Broadcast Channel (PBCH) and an Extended PBCH (ePBCH), which may individually or collectively be referred to as a "minimum SIB". A Master Information Block (MIB) may be transmitted in the PBCH. The MIB may be used to read other channels. The MIB may be fixed in size. The MIB may potentially be decoded for not only a serving cell, but for neighboring cells too. The PBCH may be limited to reduced bandwidth at the center of the carrier.

In one aspect, the communication techniques described above for controlling RACH/MSG1 retransmissions can be used in either a contention based RACH procedure or in a contention free RACH procedure.

Figure 3:
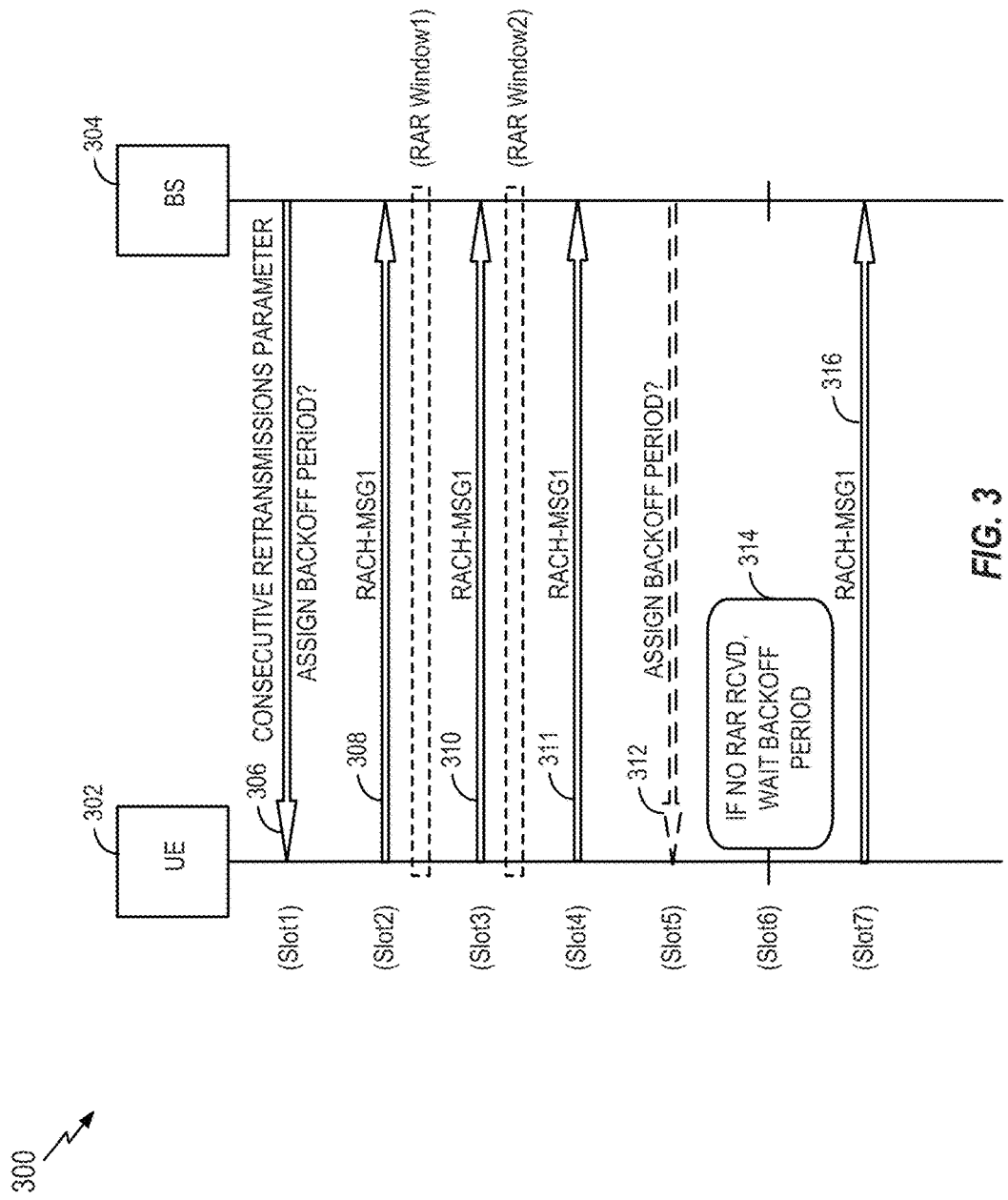
FIG. 3 illustrates an example communication system for controlling RACH/MSG1 retransmissions in accordance with some aspects of the disclosure.

FIG. 3 illustrates an example communication system 300 for controlling RACH/MSG1 retransmissions in accordance with some aspects of the disclosure. The system 300 includes a UE 302 (e.g., mmW UE such as 104/106 of FIG. 1) in communication with a base station (BS) 304 (e.g., eNode B or mmW base station such as 102 of FIG. 1). In some aspects, the actions of the system 300 may be performed by any of the mmW base station 102 and/or UEs 104/106 of FIG. 1. In one aspect, system 300 can be substantially similar to system 200 of FIG. 2 except that various intervening RAR windows may be included between MSG1 retransmissions.

In a first slot (e.g., Slot1 or a subset of Slot1), the base station 304 transmits at 306 a consecutive retransmissions parameter (e.g., index or actual value) indicative of a maximum number of consecutive MSG1 retransmissions that the UE 302 is permitted to perform. As will be discussed in further detail below, an index may be used to look up an actual value of a parameter in a table, where the index uses less bits than an actual value would use. In one aspect, the base station 304 may also transmit a backoff period parameter (e.g., index or actual value) in at 306 for Slot1. For the example presented in FIG. 3, the consecutive retransmissions parameter can be 3 and the backoff period can be 40 milliseconds (ms).

In a second slot (e.g., Slot2 or subset of Slot2), the UE 302 transmits a first RACH request (e.g., MSG1) at 308.

In a third slot (e.g., Slot3 or subset of Slot3), the UE 302 transmits a second RACH request (e.g., MSG1) at 310, after a first RAR window (RAR Window1).

In a fourth slot (e.g., Slot4 or subset of Slot4), the UE 302 transmits a third RACH request (e.g., MSG1) at 311, after a second RAR window (RAR Window2). Since Slot4 is right after Slot3, the UE 302 has effectively transmitted consecutive MSG1 retransmission signals for the maximum number of times (i.e., 3 for this example). In one aspect, any of the first, second or third slots may contain one or more RACH occasions, during which the UE 302 may transmit a RACH request. As such, in one aspect, any of the first, second, or third RACH requests may be sent during the second slot, the third slot, or the fourth slot. As contrasted with prior approaches such as those used in LTE, this consecutive MSG1 transmissions approach avoids the randomness of the retransmission attempt, which allows for some of the advantages described herein.

In the example illustrated in FIG. 3, the BS 304 can initially receive the first RACH request (e.g., MSG1) at 308, and then the second RACH request (e.g., MSG1) at 310 after expiration of the first RAR window (RAR Window1). The UE 302 sends a third RACH request (e.g., MSG1) at 311 after expiration of a second RAR window (RAR Window2). In such case, the MSG1 retransmissions (after the first MSG1 transmission) are each sent after expiration of a RAR window, until the number of MSG1 retransmissions performed reaches the consecutive retransmissions parameter. In this example, each consecutive MSG1 retransmission occurs after an intervening RAR window, and the next consecutive MSG1 retransmission occurs after a next RAR window. In such case, the MSG1 retransmissions are consecutive but spaced apart by intervening RAR windows. In one aspect, the BS 304 can determine whether the UE 302 is to send consecutive MSG1 retransmissions before a RAR window or after RAR windows, and communicate that information to the UE 302 (e.g., at 306 for example).

In a fifth slot (e.g., RACH Slot5), the base station 304 may transmit at 312 a backoff period parameter (e.g., index or actual value) to the UE 302.

In a sixth slot (e.g., RACH Slot6), the UE 302 may wait at 314 for the assigned backoff period until retransmitting a MSG1 at 316 since no RAR was received. The backoff period may begin after the last consecutive MSG1 retransmission (e.g., at 310) or it may begin when assigned at 312. The backoff period may be 40 ms or it may be a random value uniformly distributed between 0 and 40 ms. In the latter case (and when the backoff was initially assigned rather than at 312), the UE 302 next retransmission after 310, may occur any time up to 40 ms. Assuming the first slot to be at time 0 and slots to be 5 ms apart, that retransmission may occur at any slot ranging from slot 3 to slot 10 (see slot timing diagram 400 in FIG. 4).

Figure 4:
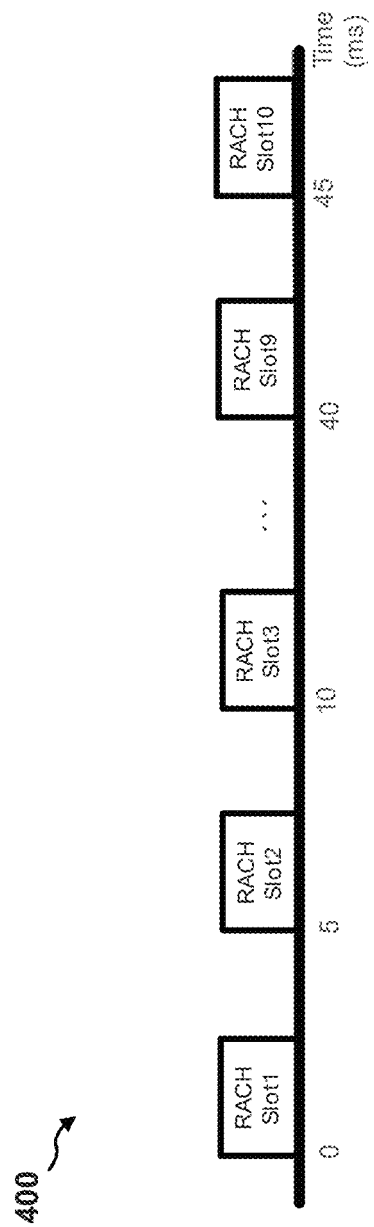
FIG. 4 illustrates a RACH timing diagram in accordance with some aspects of the disclosure.

FIG. 4 illustrates a RACH timing diagram 400 in accordance with some aspects of the disclosure. The timing diagram 400 illustrates a series of RACH slots, which may include one or more subframes, periodically spaced (5 ms apart) that correspond with the example of FIG. 2 or the example of FIG. 3.

FIG. 5 illustrates a backoff parameter table 500 in accordance with some aspects of the disclosure. In one aspect, a base station (e.g., base station 204 of FIG. 2 or base station 304 of FIG. 3) can spend N bits to send a backoff parameter value to UE(s) (e.g., UE 202 of FIG. 2 or UE 302 of FIG. 3). For example, backoff table 500 illustrates a three bit backoff indicator index for 8 possible backoff parameter values. In the example of FIG. 2 and the example of FIG. 3, the backoff indicator index equals 4 to correspond with a backoff period of 40 ms.

FIG. 6 illustrates a consecutive MSG1 retransmissions parameter table 600 in accordance with some aspects of the disclosure. In one aspect, the base station can spend M bits to send a consecutive retransmissions parameter value (e.g., maximum number of consecutive MSG1 retransmissions) to UE(s). For example, consecutive retransmissions table 600 illustrates a two bit consecutive retransmission index for 4 possible consecutive retransmission parameter values. In the example of FIG. 2, the consecutive retransmission index equals 1 which corresponds with a (maximum) number of consecutive MSG1 retransmissions of 2.

Examples for Non-Coherent Signal Combinations

In millimeter wave (MMW) systems, a directional RACH (DRACH) may be used for initial network access. A base station may sweep across different directions in different time slots and wait to receive a RACH signal from one or more user equipments (UEs). The RACH duration may depend on a UE with the weakest link gain. Thus, the overhead for the RACH may be high. By controlling the maximum number of consecutive MSG1 retransmissions to the UE as described above, a base station may non-coherently combine separate signals across multiple consecutive RACH/MSG1 retransmissions.

Figure 7:
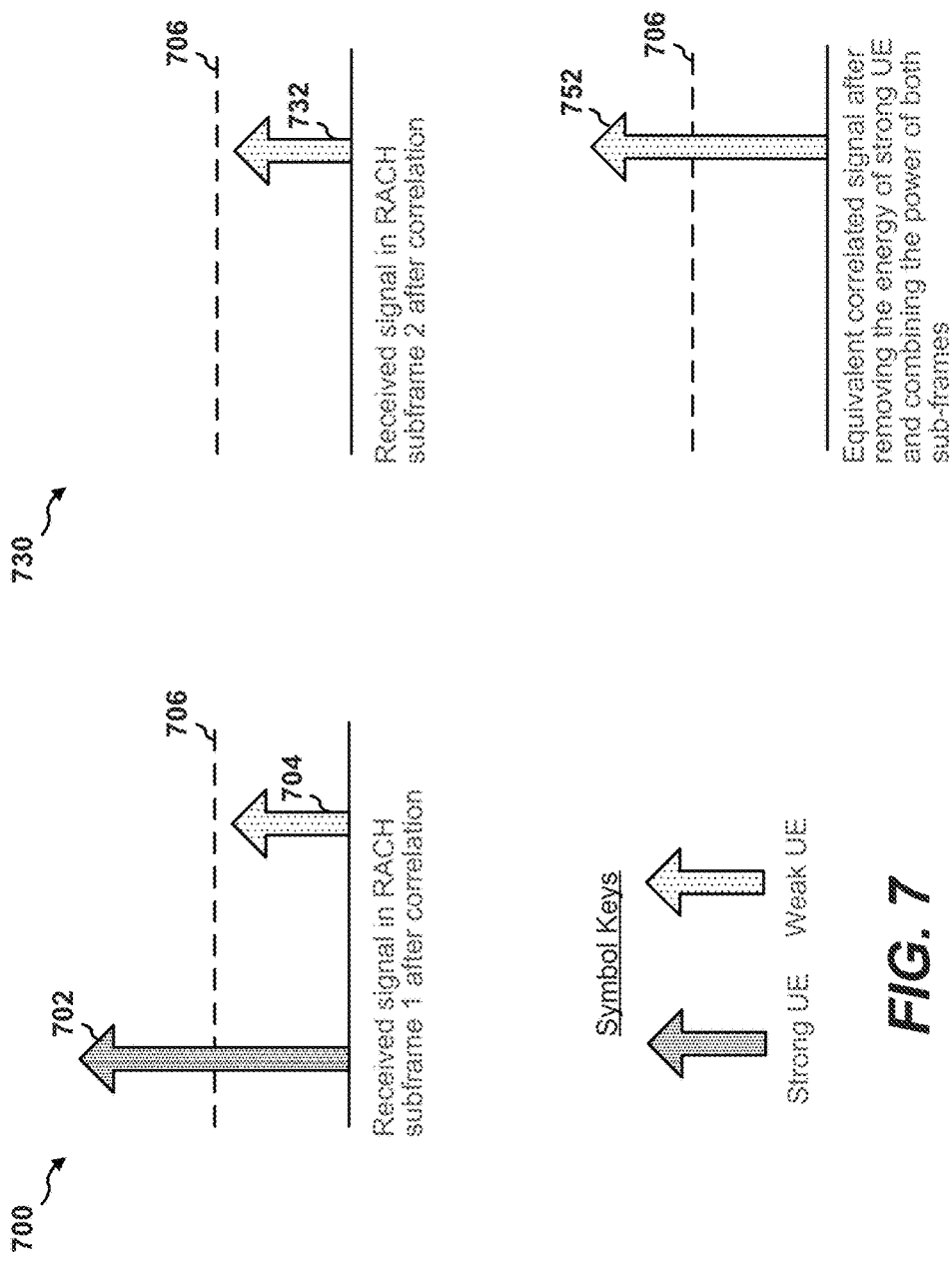
FIG. 7 is a diagram illustrating an example of combining signals of two RACH subframes to decode a RACH signal in accordance with some aspects of the disclosure.

FIG. 7 is a diagram illustrating an example of combining signals of two RACH subframes to decode a RACH signal in accordance with some aspects of the disclosure. At 700, the base station (e.g., 204 or 304) receives a signal 702 from a strong UE and a signal 704 from a weak UE in RACH subframe 1 (e.g., RACH Slot1). In one configuration, each of the signals 702 and 704 may convey at least a portion of the RACH preamble (e.g., contained in RACH MSG1) from the respective UE. A power threshold level 706 indicates the threshold level of power in a signal after correlation of the signal with a predefined RACH preamble in order for the base station to detect the signal. As to correlation, assume that the received signal is y and the predefined RACH preamble is s. Assume that the length of both these signals is N. Then the correlated signal z at time shift n can be defined as:

$$z(n) = \text{circshift}(y,n)'*s \text{ for } 0 <= n <= N-1$$

where circshift(y,n) denotes the signal y, circularly shifted by n samples. The symbol y' denotes the complex conjugate of y. Now, the power of the correlated signal can be found as $|z|^2$.

Because the signal 702 exceeds the power threshold level 706 after correlation and the signal 704 does not exceed the power threshold level 706 after correlation, the base station can only detect the signal 702 from the strong UE and get the timing of signal 702 with the appropriate circular shift. In one configuration, the base station may find the total power of the RACH subframe 1 after correlation, and subtract the correlated power corresponding to the signal 702 to obtain an updated power of RACH subframe 1. In one configuration, the base station may transmit a RACH message 2 (e.g., RACH MSG2 or a random access response (RAR) message of a contention based random access procedure) to the corresponding beam direction to convey whether or not the base station has decoded the RACH preamble in one subframe. Upon reception of the RACH message 2, the weak UE may realize that the base station decoded a strong UE's RACH signal because the base station could not have decoded the weak UE's signal in one RACH subframe.

At 730, the base station receives a signal 732 from the weak UE in RACH subframe 2 (e.g., in RACH Slot2). The base station determines the power in RACH subframe 2 after correlation and adds the power to the updated power of RACH subframe 1. After addition, a signal 752 is obtained. The signal 752 is an equivalent correlated signal after removing the energy of the strong UE and combining the power of subframes 1 and 2. The signal 752 may exceed the power threshold level 706. Thus, the signal 752 of the weak UE can be detected by the base station.

Figure 8:
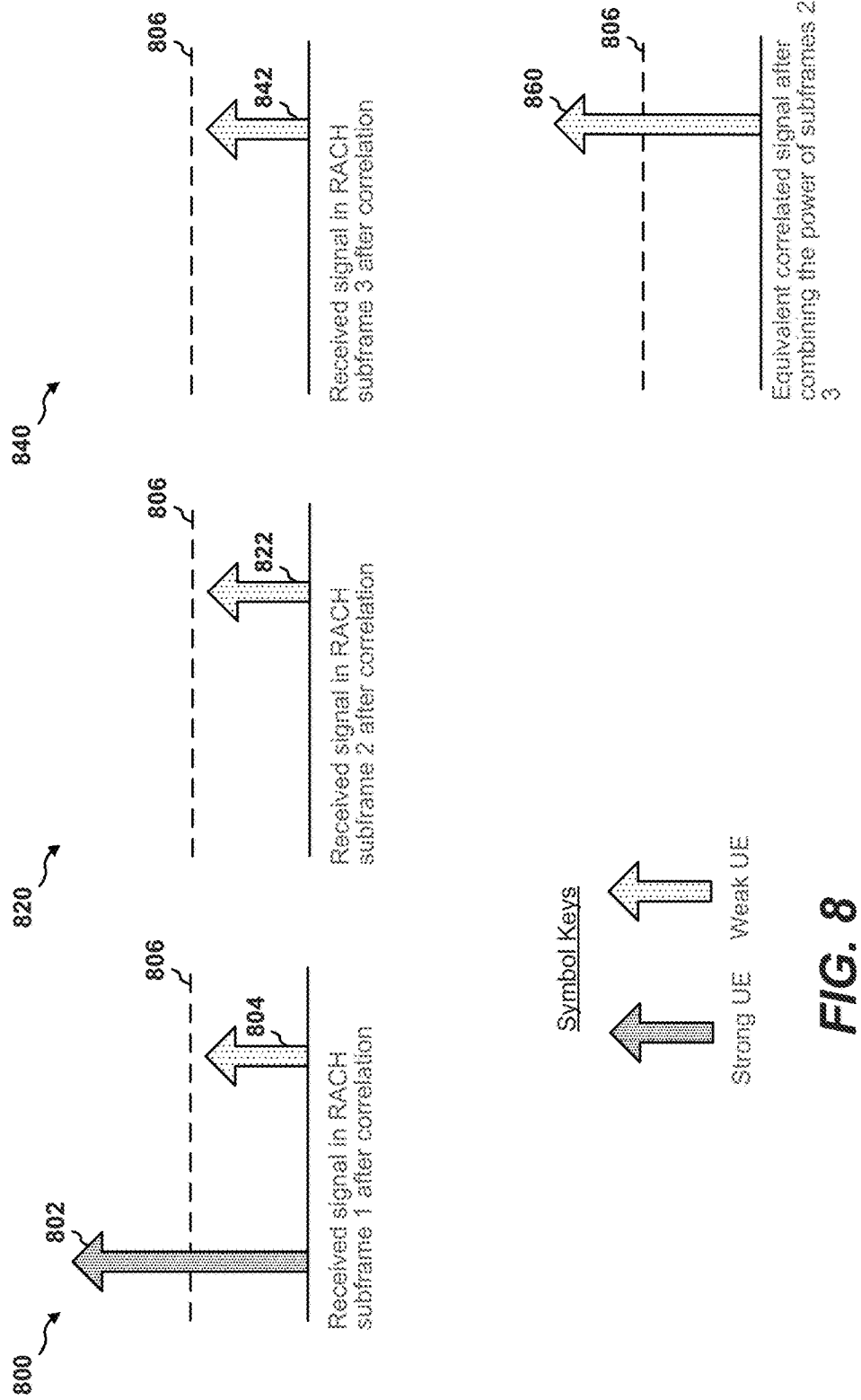
FIG. 8 is a diagram illustrating an example of combining selected signals of three RACH subframes to decode a RACH signal in accordance with some aspects of the disclosure.

FIG. 8 is a diagram illustrating an example of combining selected signals of three RACH subframes to decode a RACH signal in accordance with some aspects of the disclosure. At 800, the base station (e.g., 204 or 304) receives a signal 802 from a strong UE and a signal 804 from a weak UE in RACH subframe 1 (e.g., RACH Slot1). In one configuration, each of the signals 802 and 804 may convey the RACH preamble from the respective UE. A power threshold level 806 indicates the threshold level of power in a signal after the signal gets correlated with a RACH preamble in order for the base station to detect that signal. Because the signal 802 exceeds the power threshold level 806 after correlation and the signal 804 does not exceed the power threshold level 806 after correlation, the base station can only detect the signal 802 from the strong UE. In one configuration, the base station may ignore the remaining power of the RACH subframe 1.

In one configuration, the base station may transmit a RACH message 2 (e.g., a random access response message of contention based random access procedure) to the corresponding beam direction to convey whether or not the base station has decoded the RACH preamble in one subframe. Upon reception of the RACH message 2, the weak UE may realize that the base station decoded a strong UE's RACH signal because the base station cannot decode the weak UE's signal in one RACH subframe. The weak UE may realize that the RACH signal may need to be transmitted in two subsequent subframes so that the base station can decode the RACH signal from the weak UE.

At 820, the base station receives a signal 822 from the weak UE in RACH subframe 2 (e.g., RACH Slot2). At 840, the base station receives a signal 842 from the weak UE in RACH subframe 3 (e.g., RACH Slot3). Neither the signal 822 nor the signal 842, after being correlated with the RACH preamble, exceeds the power threshold level 806. The base station may non-coherently combine the power of subframes 2 and 3 (or subframes 1 and 2, or subframes 1 and 3, or subframes 1, 2, and 3) and obtain an equivalent correlated signal 860 for the weak UE, which exceeds the power threshold level 806. Thus, the base station is able to detect the weak UE's signal by correlating the received signal with the RACH preamble and then combining the power of the correlated signals of subframes 2 and 3. In one configuration, non-coherently combining of two correlated signals may mean the base station does not need the phase information of the correlated signals to combine the signals. In one configuration, non-coherently combining may mean combining the amplitude of the correlated signals/power.

In contention free RACH, the BS informs a UE to transmit with a dedicated RACH preamble. In such case, two UEs don't collide by transmitting with the same preamble. The BS can non-coherently combine the power of correlation signal across multiple receptions and try to detect the UE.

Beamforming Examples

Figure 9:
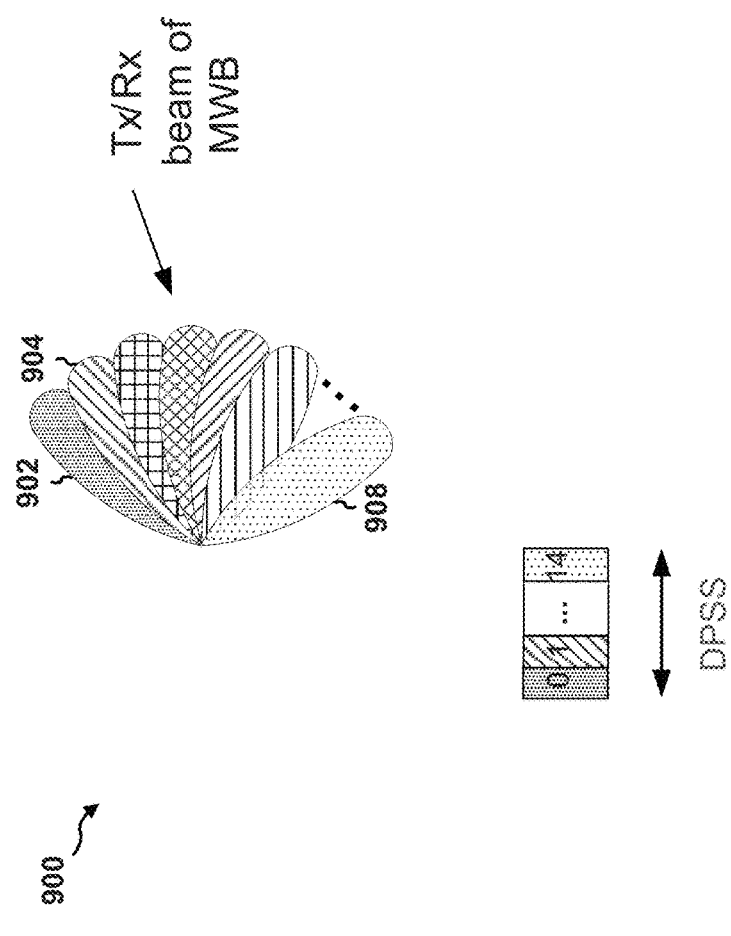
FIG. 9 is a diagram illustrating an example of directional primary synchronization signal (DPSS) in a millimeter wave system in accordance with some aspects of the disclosure.

FIG. 9 is a diagram 900 illustrating an example of directional primary synchronization signal (DPSS) in a millimeter wave system in accordance with some aspects of the disclosure. As to background on DPSS, a UE (e.g., 202 or 302) attempting to access a wireless network may perform an initial cell search by detecting a primary synchronization signal (PSS) from a base station (e.g., 204 or 304). The PSS may enable synchronization of slot timing and may indicate a physical layer identity value. The UE may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. In some cases, either the PSS of the SSS may be a directional transmission (i.e., a directional PSS (DPSS)). In some cases, a DPSS may be used to convey information about the beam used for transmission. That is, the periodicity and continuous transmission of DPSS beacon sequences may make them appropriate for measuring interference and generating local interference graphs.

In FIG. 9, different TX/RX beam directions (e.g., 902, 904, . . . 908) of millimeter wave band are illustrated with different patterns. To enable the UE (e.g., 202) to learn useful TX/RX beam pairs and to overcome high path loss, beamforming is used on RX and TX. The base station (e.g., 204) sends out PSS on several successive symbols but in different beam directions sweeping through the entire sector. For example, in each synchronization subframe, the PSS on symbol 0 may be in beam direction 902, the PSS on symbol 1 may be in beam direction 904, . . . , and the PSS on symbol 14 may be in beam direction 908. By sending out the PSS in different beam directions, the UE may be able to detect and select the best beam pair for TX/RX.

Figure 10:
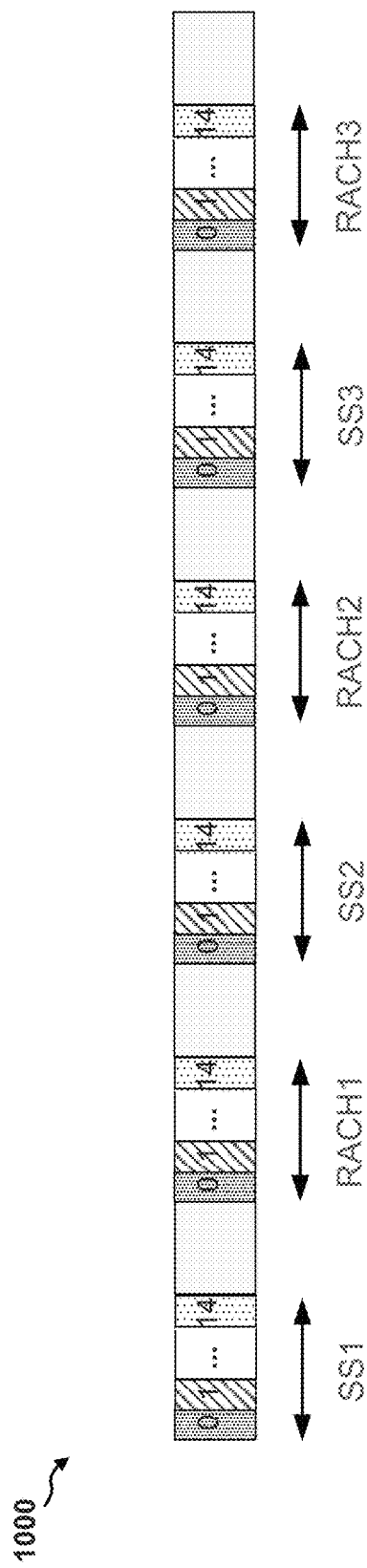
FIG. 10 illustrates an example of retransmitting RACH across multiple attempts/transmissions in accordance with some aspects of the disclosure.

FIG. 10 illustrates an example of retransmitting RACH across multiple attempts/transmissions in accordance with some aspects of the disclosure. In one aspect, RACH can be retransmitted across multiple attempts/transmissions due to the absence of beam correspondence. If the UE (e.g., 202) has beam correspondence (e.g., good link gain), the base station (e.g., 204) sweeps through its TX beams, and the UE can sweep through its RX beams and find the best BS-UE beam pair during SYNC reception (e.g., reception of the secondary synchronization signal (SSS or SS)). In such case, the UE can transmit RACH only once (e.g., RACH1 in diagram 1000) after SYNC reception (SS1 in diagram 1000). In one configuration, the best beam pair may be the beam pair with the strongest signal and/or the least inference.

If the UE does not have beam correspondence (e.g., poor link gain), it has to transmit through multiple TX beams. In one example, the UE has to transmit at least twice (e.g., in RACH2 or RACH3 in diagram 1000). In one aspect, the UE has beam correspondence when the UE is able to determine a transmit beam for uplink transmission of the UE based on downlink measurements on receive beams of the UE.

The UE (e.g., 202) may select the best beam based on the received DPSS and find corresponding timing to transmit RACH signal. In one configuration, the best beam may be the beam with the strongest signal and/or the least inference. In one configuration, the UE may select subcarrier region and cyclic shift randomly. The RACH duration depends on the UE with the weakest link gain. As the UE of the weakest link gain needs more time to transmit enough energy for the RACH signal to be detected by the base station, the RACH duration may be long, thus leading to high overhead.

In one configuration, using combined RACH signals across multiple attempts may reduce RACH duration. UEs with good link gain may transmit the RACH in one attempt. UEs with poor link gain may transmit the RACH in two or more attempts. The base station (e.g., 204) may keep a memory for energy received in one or more previous attempts and combine received energy across two or more attempts to provide better link budget for weak UEs.

First Example Apparatus

Figure 11:
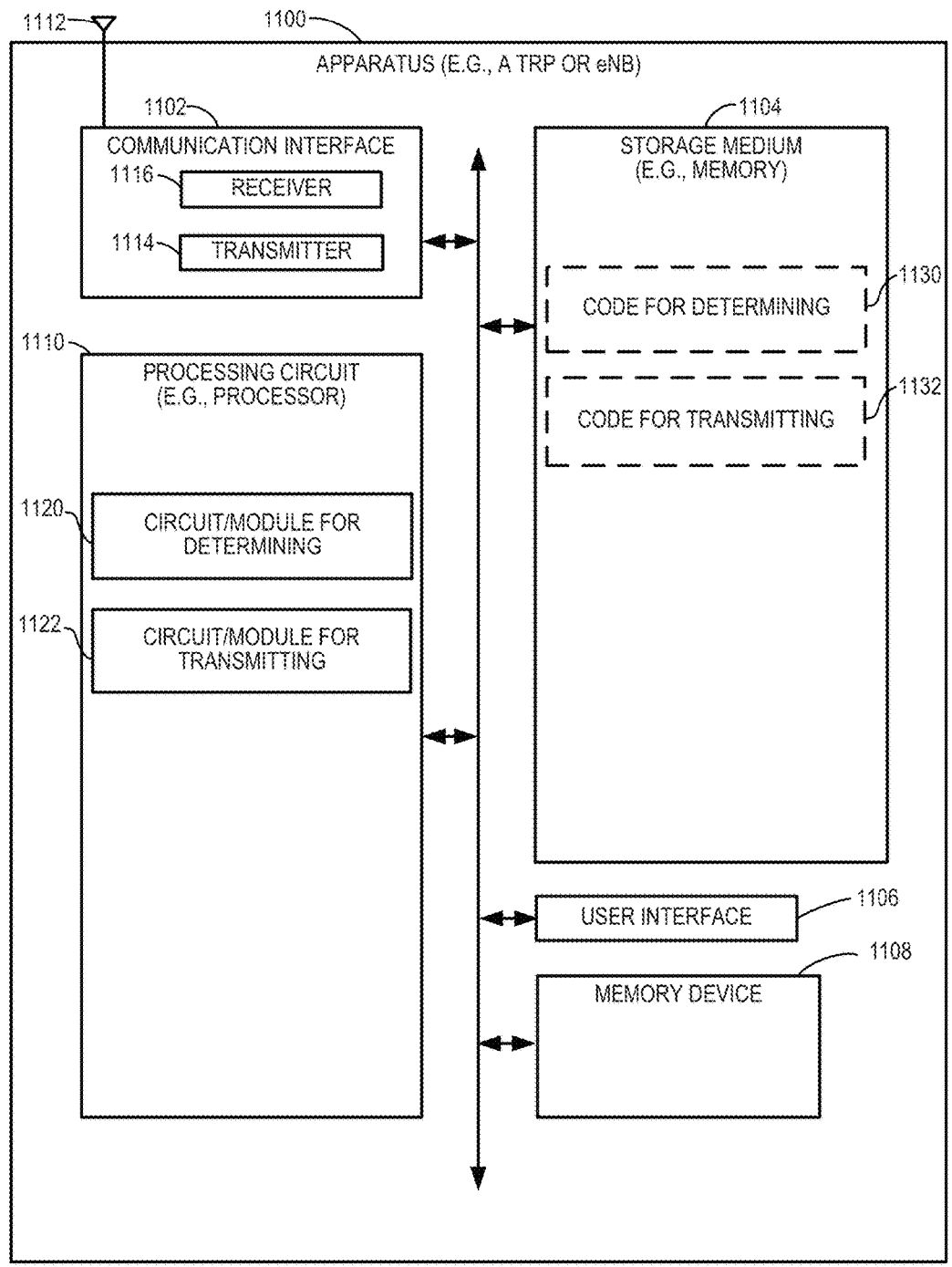
FIG. 11 illustrates a block diagram of an example hardware implementation of an apparatus (e.g., an electronic device) configured to control consecutive MSG1 retransmissions according to one or more aspects of the disclosure.

FIG. 11 illustrates a block diagram of an example hardware implementation of an apparatus 1100 configured to control consecutive MSG1 retransmissions according to one or more aspects of the disclosure. The apparatus 1100 could embody or be implemented within a UE, a CPE, a TRP, a base station (BS), an eNode B (eNB), a gNode B (gNB), or some other type of device that supports wireless communication. In various implementations, the apparatus 1100 could embody or be implemented within an access terminal, an access point, or some other type of device. In various implementations, the apparatus 1100 could embody or be implemented within a mobile phone, a smart phone, a tablet, a portable computer, a server, a personal computer, a sensor, an entertainment device, a medical device, or any other electronic device having circuitry.

The apparatus 1100 includes a communication interface (e.g., at least one transceiver) 1102, a storage medium 1104, a user interface 1106, a memory device (e.g., a memory circuit) 1108, and a processing circuit 1110 (e.g., at least one processor). In various implementations, the user interface 1106 may include one or more of: a keypad, a display, a speaker, a microphone, a touchscreen display, of some other circuitry for receiving an input from or sending an output to a user.

These components can be coupled to and/or placed in electrical communication with one another via a signaling bus or other suitable component, represented generally by the connection lines in FIG. 11. The signaling bus may include any number of interconnecting buses and bridges depending on the specific application of the processing circuit 1110 and the overall design constraints. The signaling bus links together various circuits such that each of the communication interface 1102, the storage medium 1104, the user interface 1106, and the memory device 1108 are coupled to and/or in electrical communication with the processing circuit 1110. The signaling bus may also link various other circuits (not shown) such as timing sources, peripherals, voltage regulators, and power management circuits, which are well known in the art, and therefore, will not be described any further.

The communication interface 1102 provides a means for communicating with other apparatuses over a transmission medium. In some implementations, the communication interface 1102 includes circuitry and/or programming adapted to facilitate the communication of information bi-directionally with respect to one or more communication devices in a network. For example, the communication interface 1102 may be adapted to facilitate wireless communication of the apparatus 1100. Thus, in some implementations, the communication interface 1102 may be coupled to one or more antennas 1112 as shown in FIG. 11 for wireless communication within a wireless communication system. In some implementations, the communication interface 1102 may be configured for wire-based communication. For example, the communication interface 1102 could be a bus interface, a send/receive interface, or some other type of signal interface including drivers, buffers, or other circuitry for outputting and/or obtaining signals (e.g., outputting signal from and/or receiving signals into an integrated circuit). The communication interface 1102 can be configured with one or more standalone receivers and/or transmitters, as well as one or more transceivers. In the illustrated example, the communication interface 1102 includes a transmitter 1114 and a receiver 1116. The communication interface 1102 serves as one example of a means for receiving and/or means transmitting.

The memory device 1108 may represent one or more memory devices. In some implementations, the memory device 1108 and the storage medium 1104 are implemented as a common memory component. The memory device 1108 may also be used for storing data that is manipulated by the processing circuit 1110 or some other component of the apparatus 1100.

The storage medium 1104 may represent one or more computer-readable, machine-readable, and/or processor-readable devices for storing programming, such as processor executable code or instructions (e.g., software, firmware), electronic data, databases, or other digital information. The storage medium 1104 may also be used for storing data that is manipulated by the processing circuit 1110 when executing programming. The storage medium 1104 may be any available media that can be accessed by a general purpose or special purpose processor, including portable or fixed storage devices, optical storage devices, and various other mediums capable of storing, containing or carrying programming.

By way of example and not limitation, the storage medium 1104 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 1104 may be embodied in an article of manufacture (e.g., a computer program product). By way of example, a computer program product may include a computer-readable medium in packaging materials. In view of the above, in some implementations, the storage medium 1104 may be a non-transitory (e.g., tangible) storage medium.

The storage medium 1104 may be coupled to the processing circuit 1110 such that the processing circuit 1110 can read information from, and write information to, the storage medium 1104. That is, the storage medium 1104 can be coupled to the processing circuit 1110 so that the storage medium 1104 is at least accessible by the processing circuit 1110, including examples where at least one storage medium is integral to the processing circuit 1110 and/or examples where at least one storage medium is separate from the processing circuit 1110 (e.g., resident in the apparatus 1100, external to the apparatus 1100, distributed across multiple entities, etc.).

Programming stored by the storage medium 1104, when executed by the processing circuit 1110, causes the processing circuit 1110 to perform one or more of the various functions and/or process operations described herein. For example, the storage medium 1104 may include operations configured for regulating operations at one or more hardware blocks of the processing circuit 1110, as well as to utilize the communication interface 1102 for wireless communication utilizing their respective communication protocols.

The processing circuit 1110 is generally adapted for processing, including the execution of such programming stored on the storage medium 1104. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1110 is arranged to obtain, process and/or send data, control data access and storage, issue commands, and control other desired operations. The processing circuit 1110 may include circuitry configured to implement desired programming provided by appropriate media in at least one example. For example, the processing circuit 1110 may be implemented as one or more processors, one or more controllers, and/or other structure configured to execute executable programming. Examples of the processing circuit 1110 may include a general purpose processor, a digital signal processor (DSP), an application-specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1110 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1110 are for illustration and other suitable configurations within the scope of the disclosure are also contemplated.

According to one or more aspects of the disclosure, the processing circuit 1110 may be adapted to perform any or all of the features, processes, functions, operations and/or routines for any or all of the apparatuses described herein. For example, the processing circuit 1110 may be configured to perform any of the steps, functions, and/or processes described with respect to FIGS. 1-10 or 12. As used herein, the term "adapted" in relation to the processing circuit 1110 may refer to the processing circuit 1110 being one or more of configured, employed, implemented, and/or programmed to perform a particular process, function, operation and/or routine according to various features described herein.

The processing circuit 1110 may be a specialized processor, such as an application-specific integrated circuit (ASIC) that serves as a means for (e.g., structure for) carrying out any one of the operations described in conjunction with FIGS. 1-10 or 12. The processing circuit 1110 serves as one example of a means for transmitting and/or a means for receiving. In various implementations, the processing circuit 1110 may provide and/or incorporate, at least in part, the functionality described above for the base station 204 of FIG. 2.

According to at least one example of the apparatus 1100, the processing circuit 1110 may include one or more of a circuit/module for determining 1120 or a circuit/module for transmitting 1122. In various implementations, the circuit/module for determining 1120 or the circuit/module for transmitting 1122 may provide and/or incorporate, at least in part, the functionality described above for the base station 204 (e.g., apparatus 204) of FIG. 2 or the base station 304 (e.g., apparatus 304) of FIG. 3.

As mentioned above, programming stored by the storage medium 1104, when executed by the processing circuit 1110, causes the processing circuit 1110 to perform one or more of the various functions and/or process operations described herein. For example, the programming may cause the processing circuit 1110 to perform the various functions, steps, and/or processes described herein with respect to FIGS. 1-10 or 12 in various implementations. As shown in FIG. 11, the storage medium 1104 may include one or more of code for determining 1130 or code for transmitting 1132. In various implementations, the code for determining 1130 or the code for transmitting 1132 may be executed or otherwise used to provide the functionality described herein for the circuit/module for determining 1120 or the circuit/module for transmitting 1122.

The circuit/module for determining 1120 may include circuitry and/or programming (e.g., code for determining 1130 stored on the storage medium 1104) adapted to perform several functions relating to, for example, determining information. In some aspects, the circuit/module for determining 1120 (e.g., a means for determining) may correspond to, for example, a processing circuit.

Initially, the circuit/module for determining 1120 may obtain information upon which the determination is to be based. For example, the circuit/module for determining 1120 may obtain information (e.g., from the memory device 1108, or some other component of the apparatus 1100) regarding a maximum number of consecutive MSG1 retransmissions that a user equipment (UE) is permitted to perform, a random backoff period for a next MSG1 retransmission at the UE, or parameters for determining those values.

The circuit/module for determining 1120 may then make the designated determination based on the obtained information. For example, the circuit/module for determining 1120 may determine a maximum number of consecutive MSG1 retransmissions that a user equipment (UE) is permitted to perform or a random backoff period for a next MSG1 retransmission at the UE.

The circuit/module for determining 1120 may then output an indication of the determination to the circuit/module for transmitting 1122, or some other component of the apparatus 1100.

The circuit/module for transmitting 1122 may include circuitry and/or programming (e.g., code for transmitting 1132 stored on the storage medium 1104) adapted to perform several functions relating to, for example, transmitting information. For example, the circuit/module for transmitting 1122 may transmit the maximum number of consecutive MSG1 retransmission to the UE, or perform any other transmit actions associated with the process of FIG. 11. In some aspects, the circuit/module for transmitting 1122 (e.g., a means for transmitting) may correspond to, for example, a processing circuit.

First Example Process

Figure 12:
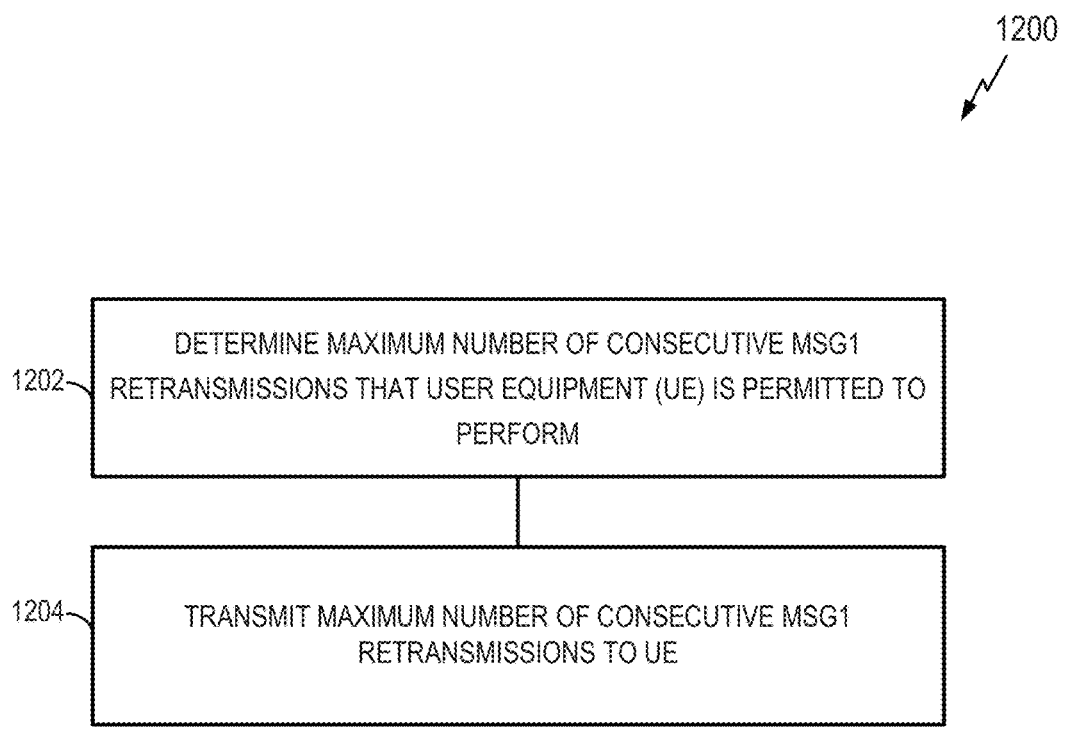
FIG. 12 is a flowchart illustrating an example of a process of controlling consecutive MSG1 retransmissions in accordance with some aspects of the disclosure.

FIG. 12 is a flowchart illustrating an example of a process 1200 for controlling consecutive MSG1 retransmissions in accordance with some aspects of the disclosure. In one aspect, process 1200 may be performed by a base station (e.g., 204 or 304). The process 1200 may take place within a processing circuit (e.g., the processing circuit 1110 of FIG. 11), which may be located in a UE, a CPE, a TRP, a BS, an eNB, a gNB, or some other suitable apparatus. Of course, in various aspects within the scope of the disclosure, the process 1200 may be implemented by any suitable apparatus capable of supporting communication-related operations.

In block 1202, the process determines a maximum number of consecutive MSG1 retransmissions that a user equipment (UE) is permitted to perform. In block 1204, the process transmits the maximum number of consecutive MSG1 retransmissions to the UE.

In one aspect, the process 1200 also receives, before a random access response (RAR) window, a first number of consecutive MSG1 retransmissions from the UE, where the first number is equal to the maximum number.

In one aspect, the process 1200 receives, before a RAR window, a consecutive MSG1 retransmission from the UE, and then repeats the receiving, after a RAR window, a subsequent consecutive MSG1 retransmission from the UE until the maximum number of consecutive MSG1 retransmissions has been received, where each subsequent consecutive MSG1 retransmission is received after a corresponding RAR window.

In one aspect, the process 1200 receives a first number of consecutive MSG1 retransmissions from the UE, where the first number is equal to the maximum number, determines a random backoff period for a next MSG1 retransmission at the UE, transmits the random backoff period to the UE, and receives the next MSG1 retransmission in accordance with the random backoff period.

In one aspect, the process 1200 transmits an indication as to whether the UE is permitted to transmit with different transmit beams during consecutive MSG1 retransmissions.

In one aspect, the process 1200 receives a first number of consecutive MSG1 retransmissions from the UE, and transmits to the UE an indication of a highest quality transmit beam among possible transmit beams (e.g., out of all possible transmit beams or based on the transmit beams already received from the UE).

In one aspect, the process 1200 transmits an indication to the UE to transmit with the same preamble and the same resource during consecutive MSG1 retransmissions.

In one aspect, the process 1200 receives consecutive MSG1 retransmissions from the UE, and combines signals of two or more of the consecutive MSG1 retransmissions to decode a random access channel (RACH) signal. In such case, the combining signals of the consecutive MSG1 retransmissions may involve non-coherently adding power of the signals of the consecutive MSG1 retransmissions.

Second Example Apparatus

Figure 13:
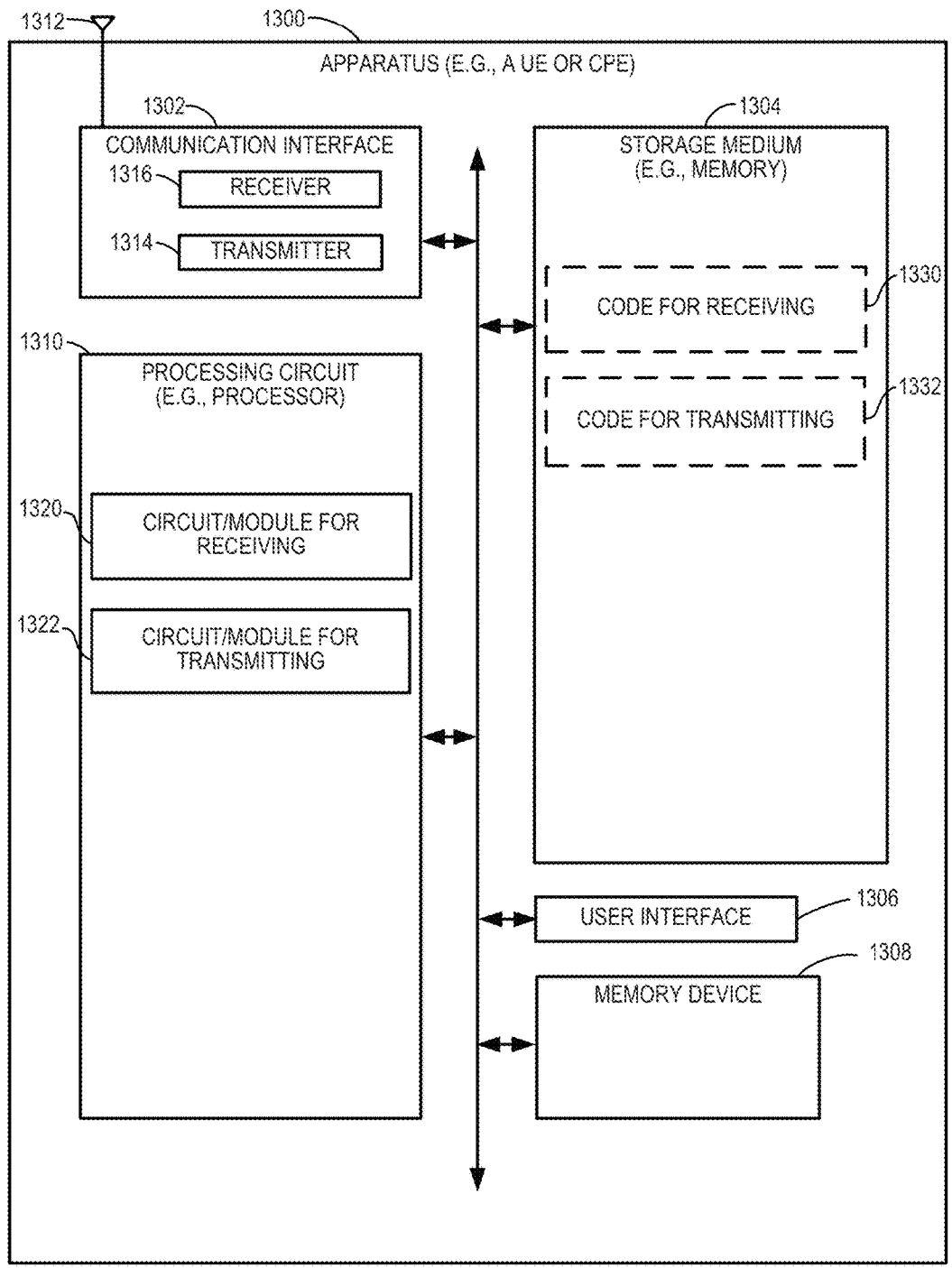
FIG. 13 illustrates a block diagram of an example hardware implementation of an apparatus (e.g., an electronic device) configured to control consecutive MSG1 retransmissions according to one or more aspects of the disclosure.

FIG. 13 illustrates a block diagram of an example hardware implementation of an apparatus 1300 configured to control consecutive MSG1 retransmissions according to one or more aspects of the disclosure. The apparatus 1300 could embody or be implemented within a TRP, a base station (BS), an eNode B (eNB), a gNode B (gNB), a UE, a CPE, or some other type of device that supports wireless communication. In various implementations, the apparatus 1300 could embody or be implemented within an access terminal, an access point, or some other type of device. In various implementations, the apparatus 1300 could embody or be implemented within a mobile phone, a smart phone, a tablet, a portable computer, a server, a personal computer, a sensor, an entertainment device, a medical device, or any other electronic device having circuitry.

The apparatus 1300 includes a communication interface (e.g., at least one transceiver) 1302, a storage medium 1304, a user interface 1306, a memory device 1308 (e.g., storing power information 1318), and a processing circuit 1310 (e.g., at least one processor). In various implementations, the user interface 1306 may include one or more of: a keypad, a display, a speaker, a microphone, a touchscreen display, of some other circuitry for receiving an input from or sending an output to a user. The communication interface 1302 may be coupled to one or more antennas 1312, and may include a transmitter 1314 and a receiver 1316. In general, the components of FIG. 13 may be similar to corresponding components of the apparatus 1100 of FIG. 11.

According to one or more aspects of the disclosure, the processing circuit 1310 may be adapted to perform any or all of the features, processes, functions, operations and/or routines for any or all of the apparatuses described herein. For example, the processing circuit 1310 may be configured to perform any of the steps, functions, and/or processes described with respect to FIGS. 1-10 and 14. As used herein, the term "adapted" in relation to the processing circuit 1310 may refer to the processing circuit 1310 being one or more of configured, employed, implemented, and/or programmed to perform a particular process, function, operation and/or routine according to various features described herein.

The processing circuit 1310 may be a specialized processor, such as an application-specific integrated circuit (ASIC) that serves as a means for (e.g., structure for) carrying out any one of the operations described in conjunction with FIGS. 1-10 and 14. The processing circuit 1310 serves as one example of a means for transmitting and/or a means for receiving. In various implementations, the processing circuit 1310 may provide and/or incorporate, at least in part, the functionality described above for the UE 202 of FIG. 2 or UE 302 of FIG. 3.

According to at least one example of the apparatus 1300, the processing circuit 1310 may include one or more of a circuit/module for receiving 1320 or a circuit/module for transmitting 1322. In various implementations, the circuit/module for receiving 1320 or the circuit/module for transmitting 1322 may provide and/or incorporate, at least in part, the functionality described above for the UE 202 of FIG. 2 or UE 302 of FIG. 3.

As mentioned above, programming stored by the storage medium 1304, when executed by the processing circuit 1310, causes the processing circuit 1310 to perform one or more of the various functions and/or process operations described herein. For example, the programming may cause the processing circuit 1310 to perform the various functions, steps, and/or processes described herein with respect to FIGS. 1-10 and 14 in various implementations. As shown in FIG. 13, the storage medium 1304 may include one or more of code for receiving 1330 or code for transmitting 1332. In various implementations, the code for receiving 1330 or the code for transmitting 1332 may be executed or otherwise used to provide the functionality described herein for the circuit/module for receiving 1320 or the circuit/module for transmitting 1322.

The circuit/module for receiving 1320 may include circuitry and/or programming (e.g., code for receiving 1330 stored on the storage medium 1304) adapted to perform several functions relating to, for example, receiving information. In some scenarios, the circuit/module for receiving 1320 may obtain information (e.g., from the communication interface 1302, the memory device, or some other component of the apparatus 1300) and process (e.g., decode) the information. In some scenarios (e.g., if the circuit/module for receiving 1320 is or includes an RF receiver), the circuit/module for receiving 1320 may receive information directly from a device that transmitted the information. In either case, the circuit/module for receiving 1320 may output the obtained information to another component of the apparatus 1300 (e.g., the circuit/module for scheduling 1322, the memory device 1308, or some other component).

The circuit/module for receiving 1320 (e.g., a means for receiving) may take various forms. In some aspects, the circuit/module for receiving 1320 may correspond to, for example, an interface (e.g., a bus interface, a send/receive interface, or some other type of signal interface), a communication device, a transceiver, a receiver, or some other similar component as discussed herein. In some implementations, the communication interface 1302 includes the circuit/module for receiving 1320 and/or the code for receiving 1330. In some implementations, the circuit/module for receiving 1320 and/or the code for receiving 1330 is configured to control the communication interface 1302 (e.g., a transceiver or a receiver) to receive information.

The circuit/module for transmitting 1322 may include circuitry and/or programming (e.g., code for transmitting 1332 stored on the storage medium 1304) adapted to perform several functions relating to, for example, transmitting information. For example, the circuit/module for transmitting 1322 may transmit consecutive MSG1 retransmission signals for a maximum number of times (e.g., as specified in the received information), or perform any other transmit actions associated with the process of FIG. 13. In some aspects, the circuit/module for transmitting 1322 (e.g., a means for transmitting) may correspond to, for example, a processing circuit.

Second Example Process

Figure 14:
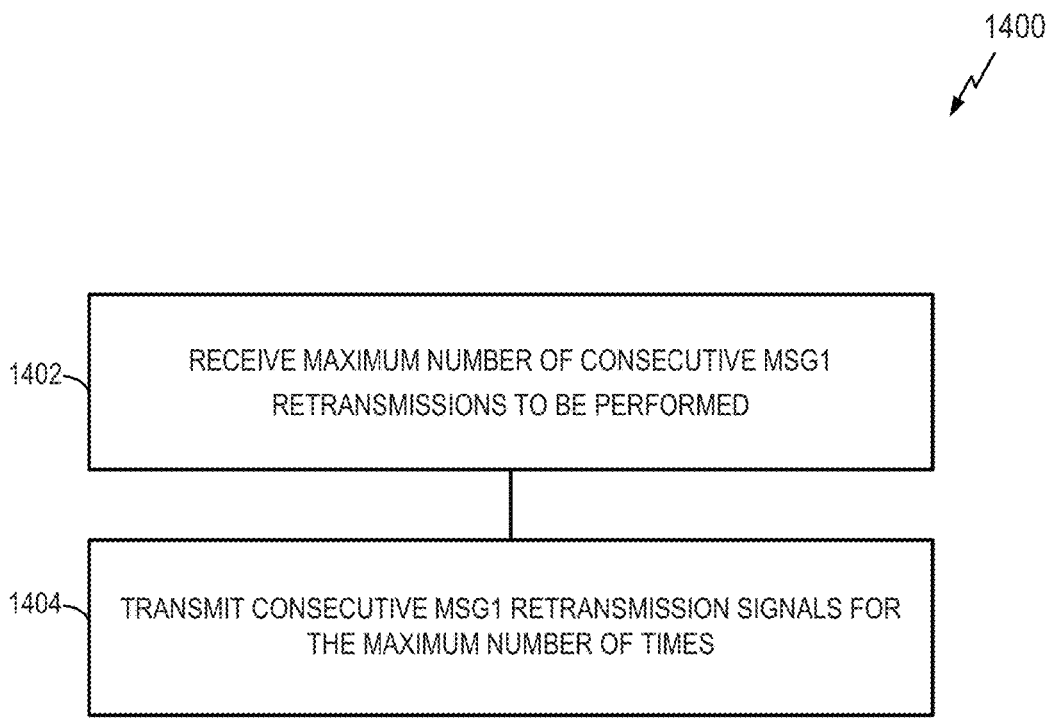
FIG. 14 is a flowchart illustrating another example of a process of controlling consecutive MSG1 retransmissions in accordance with some aspects of the disclosure.

FIG. 14 is a flowchart illustrating another example of a process 1400 for controlling consecutive MSG1 retransmissions in accordance with some aspects of the disclosure. In one aspect, process 1400 may be performed by a user equipment (e.g., UE 202). The process 1400 may take place within a processing circuit (e.g., the processing circuit 1410 of FIG. 14), which may be located in a UE, a CPE, a TRP, a BS, an eNB, a gNB, or some other suitable apparatus. Of course, in various aspects within the scope of the disclosure, the process 1400 may be implemented by any suitable apparatus capable of supporting communication-related operations.

In block 1402, the process 1400 receives a maximum number of consecutive MSG1 retransmissions to be performed. In block 1404, the process transmits consecutive MSG1 retransmission signals for the maximum number of times.

In one aspect, the transmitting consecutive MSG1 retransmission signals may include transmitting, before a RAR window, a first number of consecutive MSG1 retransmissions, where the first number is equal to the maximum number.

In one aspect, the transmitting consecutive MSG1 retransmission signals may include transmitting, before a RAR window, a consecutive MSG1 retransmission, and repeating the transmitting, after a RAR window, a subsequent consecutive MSG1 retransmission until a maximum number of consecutive MSG1 retransmissions has been transmitted, where each subsequent consecutive MSG1 retransmission is transmitted after a corresponding RAR window.

In one aspect, the process 1400 also receives a random backoff period for a next MSG1 retransmission, and transmits a MSG1 retransmission signal in accordance with the random backoff period.

In one aspect, the process 1400 receives an authorization to transmit with different transmit beams during consecutive MSG1 retransmissions, and transmits consecutive MSG1 retransmission signals with different transmit beams.

In one aspect, the process 1400 receives an indication of a highest quality transmit beam among possible transmit beams, and transmits consecutive MSG1 retransmission signals with/using the highest quality transmit beam.

In one aspect, the process 1400 receives an indication to transmit with a same preamble and a same resource during consecutive MSG1 retransmissions, and transmits consecutive MSG1 retransmission signals with a same preamble and a same resource.

Additional Aspects

The examples set forth herein are provided to illustrate certain concepts of the disclosure. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

As those skilled in the art will readily appreciate, various aspects described throughout this disclosure may be extended to any suitable telecommunication system, network architecture, and communication standard. By way of example, various aspects may be applied to wide area networks, peer-to-peer network, local area network, other suitable systems, or any combination thereof, including those described by yet-to-be defined standards.

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

One or more of the components, steps, features and/or functions illustrated in above may be rearranged and/or combined into a single component, step, feature or function or embodied in several components, steps, or functions. Additional elements, components, steps, and/or functions may also be added without departing from novel features disclosed herein. The apparatus, devices, and/or components illustrated above may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of a, b, or c" or "one or more of a, b, or c" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. A method of communication at a base station, comprising:
   determining a maximum number of consecutive MSG1 retransmissions that a user equipment (UE) is permitted to perform;
   transmitting information indicating the maximum number of consecutive MSG1 retransmissions to the UE;
   receiving, before a random access response (RAR) window, a consecutive MSG1 retransmission from the UE; and
   repeating the receiving, after the RAR window, one or more subsequent consecutive MSG1 retransmissions from the UE until the maximum number of consecutive MSG1 retransmissions has been received, wherein each subsequent consecutive MSG1 retransmission is received after a corresponding RAR window.

2. The method of claim 1, further comprising:
   receiving a first number of consecutive MSG1 retransmissions from the UE, wherein the first number is equal to the maximum number;
   determining a random backoff period for a next MSG1 retransmission at the UE;
   transmitting the random backoff period to the UE; and
   receiving the next MSG1 retransmission in accordance with the random backoff period.

3. The method of claim 1, further comprising:
   transmitting an indication as to whether the UE is permitted to transmit with different transmit beams during consecutive MSG1 retransmissions.

4. The method of claim 3, further comprising:
   receiving a first number of consecutive MSG1 retransmissions from the UE; and
   transmitting to the UE an indication of a highest quality transmit beam among possible transmit beams.

5. The method of claim 1, further comprising:
   transmitting an indication to the UE to transmit with a same preamble and a same resource during consecutive MSG1 retransmissions.

6. The method of claim 1, further comprising:
   combining signals of two or more consecutive MSG1 retransmissions to decode a random access channel (RACH) signal, wherein the combining the signals of the consecutive MSG1 retransmissions comprises non-coherently adding power of the signals of the consecutive MSG1 retransmissions.

7. A method of communication at a user equipment (UE), comprising:
   receiving information indicating a maximum number of consecutive MSG1 retransmissions to be performed; and
   transmitting consecutive MSG1 retransmission signals for the maximum number of times,
   wherein the transmitting consecutive MSG1 retransmission signals comprises:
      transmitting, before a random access response (RAR) window, a consecutive MSG1 retransmission, and repeating the transmitting, after the RAR window, one or more subsequent consecutive MSG1 retransmissions until the maximum number of consecutive MSG1 retransmissions has been transmitted, wherein each subsequent consecutive MSG1 retransmission is transmitted after a corresponding RAR window.

8. The method of claim 7, further comprising:
receiving a random backoff period for a next MSG1 retransmission; and
transmitting a MSG1 retransmission signal in accordance with the random backoff period.

9. The method of claim 7, further comprising:
receiving an authorization to transmit with different transmit beams during consecutive MSG1 retransmissions; and
transmitting consecutive MSG1 retransmission signals with different transmit beams.

10. The method of claim 9, further comprising:
receiving an indication of a highest quality transmit beam among possible transmit beams; and
transmitting consecutive MSG1 retransmission signals with the highest quality transmit beam.

11. The method of claim 7, further comprising:
receiving an indication to transmit with a same preamble and a same resource during consecutive MSG1 retransmissions; and
transmitting consecutive MSG1 retransmission signals with a same preamble and a same resource.

12. An apparatus for communication, comprising:
a memory device; and
a processing circuit coupled to the memory device and configured to:
determine a maximum number of consecutive MSG1 retransmissions that a user equipment (UE) is permitted to perform,
transmit information indicating the maximum number of consecutive MSG1 retransmissions to the UE,
receive, before a random access response (RAR) window, a consecutive MSG1 retransmission from the UE, and
repeatedly receive, after the RAR window, one or more subsequent consecutive MSG1 retransmissions from the UE until the maximum number of consecutive MSG1 retransmissions has been received, wherein each subsequent consecutive MSG1 retransmission is received after a corresponding RAR window.

13. The apparatus of claim 12, wherein the processing circuit is further configured to:
receive a first number of consecutive MSG1 retransmissions from the UE, wherein the first number is equal to the maximum number;
determine a random backoff period for a next MSG1 retransmission at the UE;
transmit the random backoff period to the UE; and
receive the next MSG1 retransmission in accordance with the random backoff period.

14. The apparatus of claim 12, wherein the processing circuit is further configured to:
transmit an indication as to whether the UE is permitted to transmit with different transmit beams during consecutive MSG1 retransmissions.

15. The apparatus of claim 14, wherein the processing circuit is further configured to:
receive a first number of consecutive MSG1 retransmissions from the UE; and
transmit to the UE an indication of a highest quality transmit beam among possible transmit beams.

16. The apparatus of claim 12, wherein the processing circuit is further configured to:
transmit an indication to the UE to transmit with a same preamble and a same resource during consecutive MSG1 retransmissions.

17. The apparatus of claim 12, wherein the processing circuit is further configured to:
combine signals of two or more consecutive MSG1 retransmissions to decode a random access channel (RACH) signal; and
non-coherently add power of the signals of the consecutive MSG1 retransmissions to decode the RACH signal.

18. An apparatus for communication, comprising:
a memory device; and
a processing circuit coupled to the memory device and configured to:
receive information indicating a maximum number of consecutive MSG1 retransmissions to be performed,
transmit consecutive MSG1 retransmission signals for the maximum number of times, wherein the processing circuit configured to transmit is further configured to:
transmit, before a random access response (RAR) window, a consecutive MSG1 retransmission, and
repeatedly transmit, after the RAR window, one or more subsequent consecutive MSG1 retransmissions until the maximum number of consecutive MSG1 retransmissions has been transmitted, wherein each subsequent consecutive MSG1 retransmission is transmitted after a corresponding RAR window.

19. The apparatus of claim 18, wherein the processing circuit is further configured to:
receive a random backoff period for a next MSG1 retransmission; and
transmit a MSG1 retransmission signal in accordance with the random backoff period.

20. The apparatus of claim 18, wherein the processing circuit is further configured to:
receive an authorization to transmit with different transmit beams during consecutive MSG1 retransmissions; and
transmit consecutive MSG1 retransmission signals with different transmit beams.

21. The apparatus of claim 20, wherein the processing circuit is further configured to:
receive an indication of a highest quality transmit beam among possible transmit beams; and
transmit consecutive MSG1 retransmission signals with the highest quality transmit beam.

22. The apparatus of claim 18, wherein the processing circuit is further configured to:
receive an indication to transmit with a same preamble and a same resource during consecutive MSG1 retransmissions; and
transmit consecutive MSG1 retransmission signals with a same preamble and a same resource.

* * * * *